Patented Sept. 4, 1951

2,566,611

UNITED STATES PATENT OFFICE 2,566,611

MINERAL OIL COMPOSITION CONTAINING AN ALKYL THIENYL KETIMINE

Howard D. Hartough, Pitman, N. J., assignor to Socony-Vacuum Oil Company, Incorporated, a corporation of New York No Drawing. Application December 3, 1949, Serial No. 131,046

8 Claims. (Cl. 252—47)

This invention relates to a mineral oil composition and, more particularly, is directed to an improvement of viscous mineral oil fractions by incorporation therein of a small proportion, sufficient to improve the properties thereof, of an alkyl thienyl ketimine.

As is well known to those familiar with the art, substantially all of the numerous fractions obtained from mineral oils and refined for their various uses are susceptible to oxidation. The susceptibility of an oil fraction to oxidation and the manner in which oxidation manifests itself within the oil varies with the type and degree of refining to which the oil has been subjected and with the conditions under which it is used or tested; that is, the products formed in an oil fraction as a result of oxidation and the degree to which they are formed depend on the extent to which the various unstable constituents, or constituents which may act as oxidation catalysts, have been removed by refining operations and also upon the conditions of use.

The present invention is predicated upon the discovery that a group of new chemical compounds, the alkyl thienyl ketimines, greatly improve the oxidation characteristics of mineral oil fractions by the incorporation therein of minor proportions of these compounds. It has been found that by the addition of an alkyl thienyl ketimine to a viscous mineral oil fraction, the development of undesirable products and properties, such as acid, sludge, discoloration, and corrosiveness toward alloy-bearing metals, normally encountered under conditions of use, has been substantially inhibited.

The compounds of this invention may be designated by the general formula:

where R is an alkyl group of from 1 to 17 carbon atoms, R' represents an aryl or alkyl radical of at least 5 carbon atoms, R'' is a substituent of hydrogen, halogen, amino, nitro, or an alkyl group and n is a whole number from 1 to 3. These compounds may suitably be prepared by direct condensation between an alkyl thienyl ketone and a primary monoamine. This reaction may be represented in accordance with the following general equation:

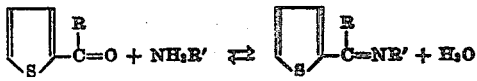

where R is an alkyl group of from 1 to 17 carbon atoms and R' is an aryl or alkyl group of at least 5 carbon atoms. The present invention also contemplates the condensation of an alkyl thienyl ketone having one or more of its nuclear hydrogen atoms substituted with various other atoms or radicals such as halogen, amino, nitro, and alkyl groups.

The above reaction is preferably carried out in the presence of an inert organic solvent such as toluene, benzene, xylene, etc., and at a temperature above the boiling point of water. Generally, the condensation will be effected under atmospheric pressure so that the temperature will be between about 100° C. and about 150° C. Water may be removed from the reaction product mixture in a mechanical manner by using a water take-off trap where water vapor generated during the course of the reaction is collected and condensed. Such mechanical methods of removing water from reaction mixtures are well known and conventionally employed in the art. An examination of the amount of water collected in the trap is a convenient method for determining substantial completion of the reaction, since the ceasing of evolution of water indicates that the condensation is virtually complete. After condensation of the primary amine and thiophene ketone has taken place, the reaction product mixture is distilled, preferably under reduced pressure, to recover any unreacted amine and thiophene ketone and to collect the desired product of alkyl thienyl ketimine.

The preferable ratio of reactants appears to be an equimolar mixture of primary aliphatic or aromatic amine and alkyl thienyl ketone. Under some conditions it may be desirable to employ more than an equimolar amount of the primary amine. As pointed out above, any unreacted starting materials are readily recovered from the reaction product mixture as low boiling distillates and may be used in further condensation reactions.

Having described in a general way the nature of this invention, the following detailed examples are given by way of illustration:

Example 1

To 150 milliliters of toluene, contained in the flask of a refluxing apparatus furnished with a water take-off trap, were added 63 grams (0.5 mole) of 2-acetylthiophene and 47 grams (0.5 mole) of aniline. The reactants were heated to reflux at a temperature of 130-133° C. for 13 hours. About 5 milliliters of water were collected in the trap. No more water was evolved after 6 more hours of heating at reflux. The contents of the flask were then transferred to a distillation vessel and upon distilling under reduced pressure, 45 grams (46 per cent yield) of a product having a boiling range of 145-153° C. at 4 millimeters pressure were collected. This material crystallized upon standing and was then recrystallized from 150 milliliters of absolute alcohol. The bright yellow crystals so obtained had a melting point of 69-70° C. Analysis showed this product, containing 7.1 per cent nitrogen and 16.1 per cent sulfur, to be N-phenyl-2-thienyl methyl ketimine having the formula:

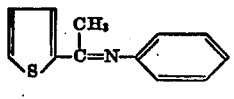

Example 2

To 41 grams (0.325 mole) of 2-acetylthiophene and 42 grams (0.325 mole) of 2-ethylhexylamine in an apparatus similar to that used in Example 1 were added 500 milliliters of toluene. The materials were heated under reflux for 22 hours and 2.5 milliliters of water were collected. The contents of the flask were then transferred to a distillation vessel and upon distilling under reduced pressure, 30 grams of a product having a boiling point range at 4 millimeters pressure of 142-157° C. were collected. Analysis showed the resulting product, containing 6.07 per cent nitrogen, to be N-(2-ethylhexyl) 2-thienyl methyl ketimine having the formula:

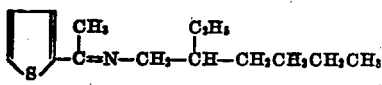

Example 3

To 38.5 grams (0.25 mole) of 2-butanoylthiophene and 46.5 grams (0.50 mole) of aniline in an apparatus similar to that used in Example 1 were added 500 milliliters of toluene. The materials were refluxed for four hours at a temperature of 130-133° C. Only 0.3 milliliter of water was obtained. The mixture was then cooled; 3 grams of iodine were added and the mixture was refluxed for 5 hours longer. A total of 1.0 milliliter of water was collected. The toluene was removed from the reaction product mixture by distillation at atmospheric pressure and the excess aniline and 2-butanoylthiophene were recovered under reduced pressure. Sixteen grams of a product having a boiling point range of 128-130° C. at 1 millimeter pressure were obtained. Analysis showed the resulting product, containing 6.19 per cent nitrogen to be N-phenyl-2-thienyl propyl ketimine having the formula:

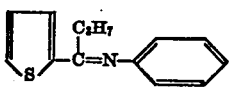

Example 4

Three moles (378 grams) of 2-acetylthiophene and three moles (2.79 grams) of aniline were refluxed in the apparatus of Example 1 with 600 milliliters of xylene at 140° C. for a period of 14 hours. Fourteen milliliters of water were collected at the end of this time. Xylene was removed from the reaction product mixture by distillation at atmospheric pressure. The remaining mixture was then distilled under reduced pressure to yield 118 grams of a product having a boiling point of 155° C. at 5 millimeters pressure. This material crystallized upon standing and was recrystallized from absolute alcohol. The bright yellow crystals had a melting point of 69-70° C. Analysis showed the product to be N-phenyl-2-thienyl methyl ketimine.

From the above examples it will be evident that a primary amine and an alkyl thienyl ketone readily undergo direct condensation without the intermediate formation of a diketal such as has heretofore been necessary in reacting an aromatic amine with an aromatic ketone of the benzene series.

It will be obvious that the invention is not limited to the foregoing examples or to the specific details given therein. Thus, for instance, instead of the alkyl thienyl ketones employed in the above illustrative condensation reactions, any of the thienyl alkyl ketones having alkyl groups containing 1 to 17 carbon atoms may be used. Also, the thienyl group may have one or more of its nuclear hydrogen atoms replaced with amino, halogen, nitro, or alkyl groups. Instead of the aromatic and aliphatic amines shown in the above examples, any of the aromatic or aliphatic amines having at least five and generally not more than 22 carbon atoms may be employed.

The reaction of this invention will usually be carried out in the absence of a catalyst. Under some conditions, however, the use of a condensation catalyst such as zinc chloride, iodine, and the like may be found to be effective. Water may be removed from the reaction product mixture by the method described, using a water take-off trap on the refluxing apparatus or, if the organic solvent employed in aiding the reaction is one which forms a low boiling azeotrope with water, such as benzene or toluene, water resulting from the condensation may be removed from the reaction product mixture in an azeotropic distillation operation. Likewise, it will be realized that if the organic solvent employed does not form an azeotrope with water, various materials which form azeotropes with water, for example, carbon tetrachloride, may be added to the reaction mixture provided they do not interfere with the desired course of the reaction.

The alkyl thienyl ketimines obtained in accordance with the above described procedures represent new organic compounds which have been found to be valuable as additives in the stabilization of petroleum oil fractions, particularly in inhibiting the development of those undesirable products and properties, such as acid, sludge, discoloration and corrosiveness toward alloy-bearing metals, normally encountered under conditions of use. Thus, it is well known that motor oils, especially those refined by certain solvent extraction methods, tend to oxidize when submitted to high temperatures and to form products that are corrosive to metal bearings. This corrosive action may be quite severe with certain bearings, such as those having the corrosion susceptibility of cadmium-silver alloys, and may cause their failure within a comparatively short time. The following test was used to determine the corrosive action of a motor oil on an automobile rod bearing.

The oil used consisted of Pennsylvania neutral and residuum stocks separately refined by means of Chlorex and then blended to give an S. A. E. 20 motor oil with a specific gravity of 0.872, a flash point of 435° F. and a Saybolt Universal viscosity of about 318 seconds at 100° F. The oil was tested by adding a section of a bearing containing a cadmium-silver alloy surface and weighing about 6 grams and heating it to 175° C. for 22 hours while a stream of air was bubbled against the surface of the bearing. The loss in weight of the bearing during this treatment measures the amount of corrosion that has taken place. A sample of the oil containing a stabilizing compound of this invention was run at the same time as a sample of the straight oil, and the loss in weight of the bearing section in the inhibited oil can thus be compared directly with the loss in the uninhibited oil. The results obtained in this test employing minor proportions of the above-described compounds as inhibitors are set forth in the following table:

| Compound Added | Per Cent Used | Mg. Loss in Weight |
|---|---|---|
| N-phenyl-2-thienyl propyl ketimine | 0<br>0.06<br>0.25<br>0.50 | 17<br>9<br>3<br>0 |
| N-phenyl-2-thienyl methyl ketimine | 0<br>0.06<br>0.12<br>0.25<br>0.50 | 17<br>9<br>3<br>0<br>0 |
| N-(2-ethylhexyl)-2-thienyl methyl ketimine | 0<br>0.12<br>0.50 | 17<br>3<br>0 |

From the foregoing test results, it will be evident that the alkyl thienyl ketimines are effective stabilizing agents for lubricating oil fractions. The quantity of compound employed as stabilizer to inhibit the undesirable effects of oxidation in the oil may vary, depending upon the character of the oil and the severity of the conditions to which it is exposed. Ordinarily, the compositions will be added to mineral oil fractions in an amount ranging from about 0.05 to about 5 per cent, but may be added in amounts up to 10 per cent by weight in some instances.

It is to be understood that the examples, procedures, and oil compositions described herein are illustrative only and are not to be construed as limiting the scope of this invention thereto. Thus, in addition to the specific compounds set forth herein, other alkyl thienyl ketimines falling within the scope of the above-described general formula may similarly be employed as additives in improving the properties of viscous mineral oil fractions normally subject to deterioration under oxidizing conditions.

This application is a continuation-in-part of U. S. Patent No. 2,492,632, issued December 27, 1949.

I claim:

1. An improved mineral oil composition comprising a major proportion of mineral oil and, in admixture therewith, a minor proportion, less than about 10 per cent by weight but sufficient to stabilize said oil against the deleterious effects of oxidation, of a compound having the general formula:

where R is an alkyl group of from 1 to 17 carbon atoms, R' is selected from the group consisting of aryl and alkyl radicals of at least 5 carbon atoms, R'' is a substituent selected from the group consisting of hydrogen, halogen, amino, nitro and alkyl groups, and n is a whole number from 1 to 3.

2. An improved mineral oil composition comprising a major proportion of mineral oil and, in admixture therewith, a minor proportion, less than about 10 per cent by weight but sufficient to stabilize said oil against the deleterious effects of oxidation, of a compound having the general formula:

where R is an alkyl group of from 1 to 17 carbon atoms, R' is an aryl group, and R'' is a substituent selected from the group consisting of hydrogen, halogen, amino, nitro and alkyl groups, and n is a whole number from 1 to 3.

3. An improved mineral oil composition comprising a major proportion of mineral oil and, in admixture therewith, a minor proportion, less than about 10 per cent by weight but sufficient to stabilize said oil against the deleterious effects of oxidation, of a compound having the general formula:

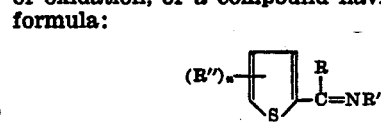

where R is an alkyl group of from 1 to 17 carbon atoms, R' is an alkyl group of at least 5 carbon atoms, and R'' is a substituent selected from the group consisting of hydrogen, halogen, amino, nitro and alkyl groups, and n is a whole number from 1 to 3.

4. An improved mineral oil composition comprising a major proportion of mineral oil and between about 0.05 and about 10 per cent by weight of a compound having the general formula:

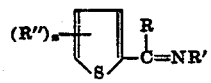

where R is an alkyl group of from 1 to 17 carbon atoms, R' is selected from the group consisting of aryl and alkyl radicals of at least 5 carbon atoms, R'' is a substituent selected from the group consisting of hydrogen, halogen, amino, nitro and alkyl groups, and n is a whole number from 1 to 3.

5. An improved mineral oil composition comprising a major proportion of mineral oil and between about 0.05 and about 5 per cent by weight of a compound having the general formula:

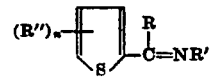

where R is an alkyl group of from 1 to 17 carbon atoms, R' is selected from the group consisting of aryl and alkyl radicals of at least 5 carbon atoms, R'' is a substituent selected from the group consisting of hydrogen, halogen, amino, nitro and alkyl groups, and n is a whole number from 1 to 3.

6. An improved mineral oil composition comprising a major proportion of mineral oil and, in admixture therewith, a minor proportion, less than about 10 per cent by weight but sufficient to stabilize said oil against the deleterious effects of oxidation, of N-phenyl-2-thienyl methyl ketimine.

7. An improved mineral oil composition comprising a major proportion of mineral oil and, in admixture therewith, a minor proportion, less than about 10 per cent by weight but sufficient to stabilize said oil against the deleterious effects of oxidation, of N-(2-ethylhexyl)-2-thienyl methyl ketimine.

8. An improved mineral oil composition comprising a major proportion of mineral oil and, in admixture therewith, a minor proportion, less than about 10 per cent by weight but sufficient to stabilize said oil against the deleterious effects of oxidation, of N-phenyl-2-thienyl propyl ketimine.

HOWARD D. HARTOUGH.

REFERENCES CITED

The following references are of record in the file of this patent:

UNITED STATES PATENTS

| Number | Name | Date |
|---|---|---|
| 2,160,293 | Shoemaker et al. | May 30, 1939 |
| 2,264,894 | Shoemaker et al. | Dec. 2, 1941 |